(12) United States Patent  
Wilcox et al.

(10) Patent No.: US 7,916,022 B2
(45) Date of Patent: Mar. 29, 2011

(54) AGRICULTURAL INFORMATION GATHERING SYSTEM

(75) Inventors: Timothy Amos Wilcox, Loraine, IL (US); Douglas Jeffrey Dickman, Normal, IL (US)

(73) Assignee: Deere & Company, Moline, IL (US)

( * ) Notice: Subject to any disclaimer, the term of this patent is extended or adjusted under 35 U.S.C. 154(b) by 1163 days.

(21) Appl. No.: 11/602,904

(22) Filed: Nov. 21, 2006

(65) Prior Publication Data

US 2008/0117023 A1    May 22, 2008

(51) Int. Cl.
G08B 13/14 (2006.01)

(52) U.S. Cl. ............... 340/572.1; 340/568.1; 340/5.92; 340/10.1

(58) Field of Classification Search ........... 340/568.1, 340/572.1, 988, 5.92, 540, 545.6, 539.13, 340/539.26, 10.1
See application file for complete search history.

(56) References Cited

U.S. PATENT DOCUMENTS

| | | |
|---|---|---|
| 3,936,824 A | 2/1976 | Aker et al. |
| 5,379,224 A | 1/1995 | Brown et al. |
| 5,963,134 A | 10/1999 | Bowers et al. |
| 6,195,006 B1 | 2/2001 | Bowers et al. |
| 6,377,888 B1 | 4/2002 | Olch |
| 6,747,560 B2 | 6/2004 | Stevens, III |
| 7,034,683 B2 * | 4/2006 | Ghazarian ............ 340/568.1 |
| 7,609,159 B2 * | 10/2009 | Benson et al. ............ 340/540 |
| 2001/0000019 A1 | 3/2001 | Bowers et al. |
| 2002/0104013 A1 * | 8/2002 | Ghazarian ............ 713/200 |
| 2003/0214387 A1 | 11/2003 | Giaccherini |
| 2004/0000997 A1 | 1/2004 | Stevens, III |
| 2004/0124982 A1 | 7/2004 | Kovach |
| 2004/0143505 A1 | 7/2004 | Kovach |
| 2005/0088320 A1 | 4/2005 | Kovach |
| 2005/0099302 A1 | 5/2005 | Lieffort et al. |
| 2005/0116020 A1 | 6/2005 | Smolucha et al. |
| 2005/0134457 A1 | 6/2005 | Rajapakse et al. |
| 2005/0156734 A1 * | 7/2005 | Zerwekh et al. ........... 340/539.1 |
| 2005/0168385 A1 * | 8/2005 | Baker ............ 343/700 MS |
| 2006/0114110 A1 | 6/2006 | Girshovich et al. |
| 2006/0145844 A1 | 7/2006 | Chen et al. |
| 2008/0024306 A1 * | 1/2008 | Bomber et al. ........... 340/572.7 |

* cited by examiner

Primary Examiner — Anh V La

(57) ABSTRACT

An agricultural portal system for use along a transportation route upon which agricultural containers having a responding device are transported, the agricultural portal system including at least one movable support, at least one identification system connected to the movable support and a communications system. The at least one identification system is directed toward the transportation route. The at least one identification system receives a signal from the responding device thereby obtaining information about the agricultural containers. The communications system communicates the information.

19 Claims, 4 Drawing Sheets

US 7,916,022 B2

AGRICULTURAL INFORMATION GATHERING SYSTEM

FIELD OF THE INVENTION

The present invention relates to an information gathering system, and, more particularly, to an information gathering system relative to the transport of agricultural products as they leave the field.

BACKGROUND OF THE INVENTION

Fruit and vegetable harvest often involves placing harvested products into a container, which can be four feet wide and long by four feet high in size. The containers are transported within the field, orchard or farm to a location where they are collocated with other containers and staged for shipping. The containers are loaded onto a truck, trailer, wagon or other transport vehicle for transportation to a storage or processing facility.

The tracking of material using radio frequency identification (RFID) tags in a warehouse is becoming a mature art. For example, in a warehouse, trucks are typically parked at loading docks and containers are moved into warehouses with a forklift. An RFID portal at the door between the loading dock and warehouse can assume the first time an ID is read at the portal, the container is moving from the truck into storage. The next time it is read, it can be assumed the container is moving from storage onto a truck.

In a field or orchard environment, there are no boundaries that are permanently established to control the flow of goods. Without walls to limit container and transport vehicle movement assumptions about the flow of goods that are detected, such as these made about goods warehouse are not valid.

What is needed in the art is a simple cost effective way of gathering information about agricultural products prior to or shortly after leaving the field.

SUMMARY OF THE INVENTION

The present invention relates to an agricultural information gathering system that is locatable proximate to a field entry point.

The present invention, in one form thereof, comprises an agricultural portal system for use along a transportation route upon which agricultural containers having a responding device are transported, the agricultural portal system including at least one movable support, at least one identification system connected to the movable support and a communications system. The at least one identification system is directed toward the transportation route. The at least one identification system receives a signal from the responding device thereby obtaining information about the agricultural containers. The communications system communicates the information.

DETAILED DESCRIPTION OF THE INVENTION

Figure 1:
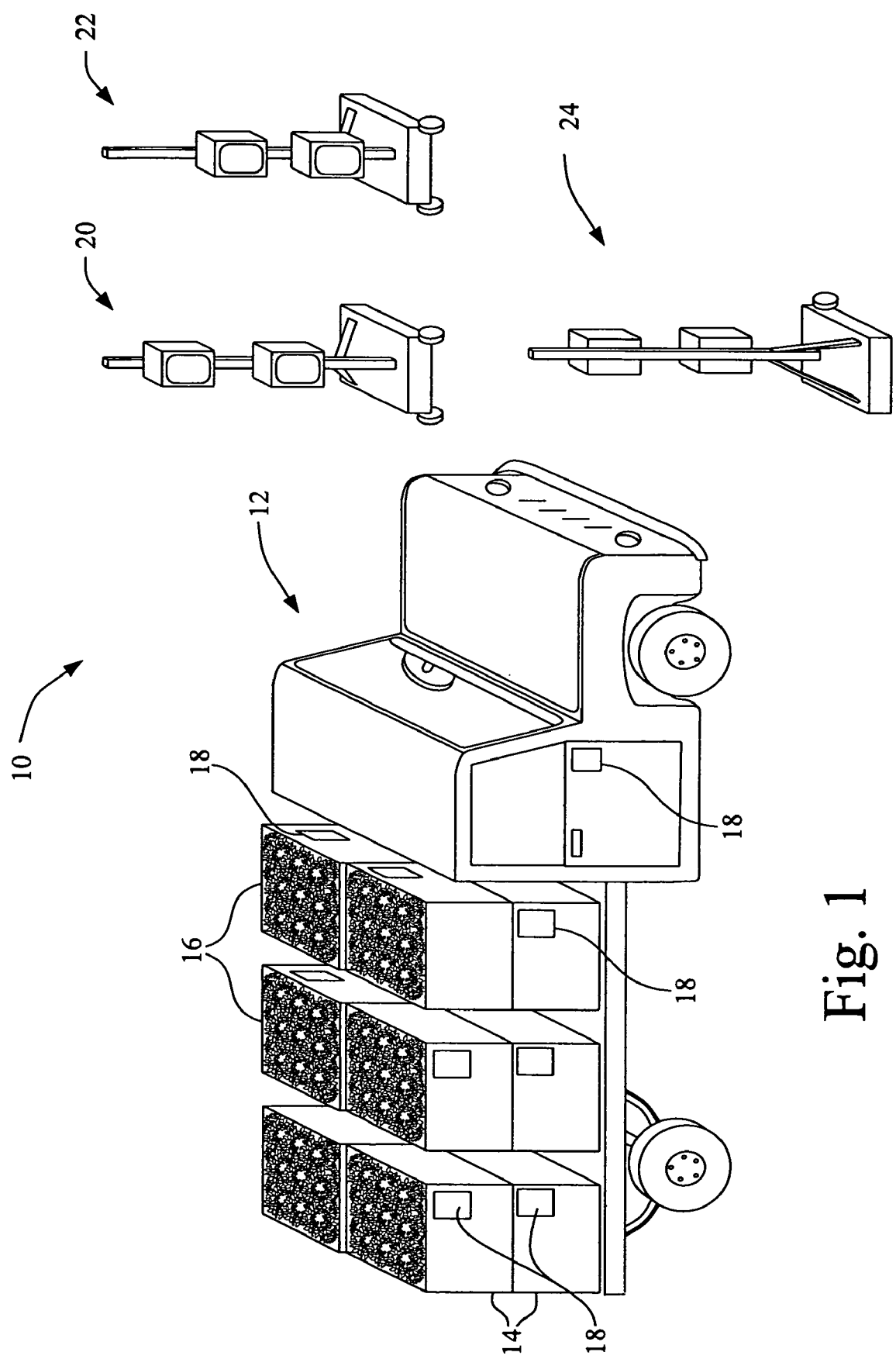
FIG. 1 is a perspective view of an embodiment of an agricultural portal system of the present invention.
Figure 2:
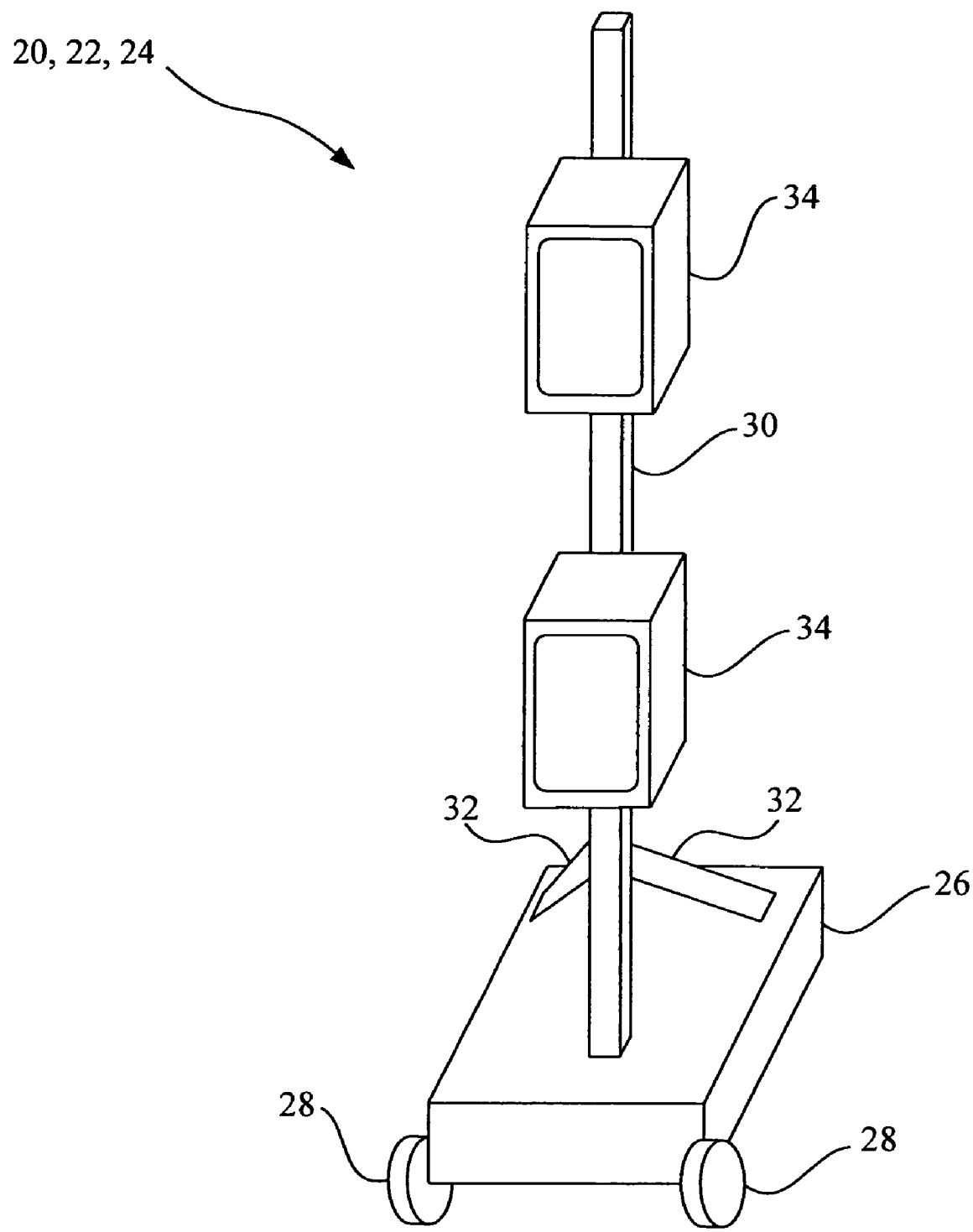
FIG. 2 is a perspective view of sensor systems mounted on a movable platform of the agricultural portal system of FIG. 1.
Figure 3:
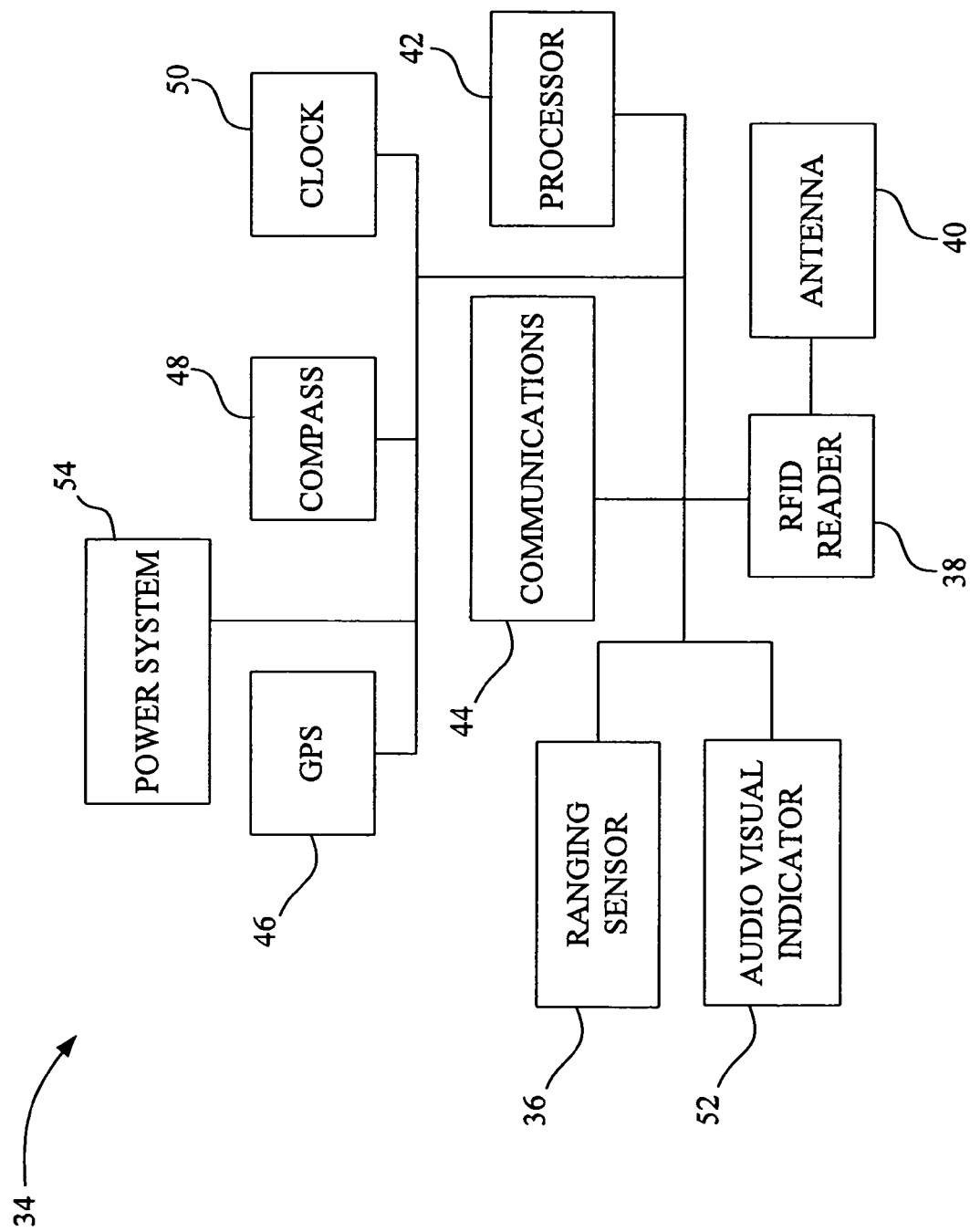
FIG. 3 is a functional diagram of the sensor system of the agricultural portal system of FIGS. 1 and 2.

Referring now to the drawings, and more particularly to FIGS. 1-3, there is illustrated an agricultural portal system 10, also known as a Radio Frequency Identification (RFID) portal system 10 with a vehicle 12 passing through the portal system. Vehicle 12 has containers 14 and 16 loaded thereon all of which have RFID tags 18 thereon. RFID tags 18 function as responding or transponding devices 18, which receive a signal and send a signal in response. RFID tags 18 may also receive power from the signal that is received to thereby have power to send the responsive signal. Containers 14 are shown as each having an RFID tag 18 located on a portion of container 14 facing the side of truck 12. Containers 16 are used herein to illustrate the location of RFID tags 18 oriented in another direction and do not otherwise differ from containers 14. In addition to the RFID tags 18 being located on each of containers 14 and 16, vehicle 12 may also have an RFID tag 18 associated therewith.

RFID portal system 10 is illustrated with three RFID stations 20, 22 and 24. Each RFID station 20, 22 and 24 includes a base 26, rollers 28, a poll 30, braces 32 and sensor systems 34. Base 26 may be weighted in order to provide stability to RFID stations 20, 22 and 24 and may even be similar to the base of a movable basketball goal. Rollers 28 facilitate the movement of RFID stations 20, 22 and 24 for easy positioning along a roadway also known as a transportation route that passes between stations 20 and 24.

Each sensor system 34 includes ranging sensors 36, an RFID reader 38, a directional antenna 40, a processor 42, communications 44, a global positioning system (GPS) 46, a compass 48, a clock 50, an audio/visual indicator 52 and a power system 54. Ranging sensor 36 detects movement of vehicle 12 as it is approaching along the roadway. Ranging sensors 36 may be utilized to wake-up sensor system 34, if it is in a low-power consumption mode. Additionally, ranging sensors 36 provide directional and velocity information relative to approaching or departing vehicle 12.

RFID reader 38 is connected to directional antenna 40 and sends a signal to and receives a signal from RFID tags 18. The vertical positioning of RFID reader 38 along pole 30 alters the effective height of the reading capability of RFID reader 38. For example, RFID station 22 has two sensor systems 34 located closer to the ground than sensor systems 34 located on stations 20 and 24. Directional antenna 40 is used to send a signal from RFID reader 38 that is received by RFID tags 18, which then return a signal that is detected by directional antenna 40 and passed on to RFID reader 38. The directional nature of antenna 40 allows for the detection of relative positions of containers 14 and 16 on truck 12 relative to the vertical positioning of containers 14 and 16.

Processor 42 functions to execute method 100 and other tasks that may be programmed therein. Processor 42 includes memory that stores data collected from sensor system 34 and at pre-programmed points of time or by inquiry from a computer system located off-site, cause processor 42 to transmit information by way of communications module 44. Communications module 44 may be a wired link, but is herein described as a radio frequency communications device for local or remote communication of data. Sensor systems 34 may be arranged in a hierarchical fashion with one sensor system 34 serving as the master unit with all other sensor systems 34 of portal system 10 functioning as slave units and communicating just with the master sensor system 34. It is the task of the master sensor system to upload information received from all RFID stations associated with portal system 10. For example, information gathered by RFID stations 20, 22 and 24 may be evaluated to estimate the location of containers 14 and 16 on the bed of vehicle 12. If RFID station 24 receives the strongest response from certain of containers 14 and 16 it may be assumed that those containers are located on the side of vehicle 12 that is closest to station 24. Additionally, if the upper sensor system 34 of station 24 receives the strongest signal of all sensor systems 34 it may be concluded that the location of a particular container is then on the upper level of containers on vehicle 12. It should also be noted that the sequence of detecting RFID tags 18 will provide horizontal position information of containers 14 and 16 relative to vehicle 12. Further, the master units can coordinate when each sensor system 34 initiates signals to be sent by respective RFID readers 38.

A GPS module 46 and a compass module 48 allow for the geo positioning and orientating of stations 20, 22 and 24. The geo orientation of stations 20, 22 and 24 establish the portal position relative to a location on the surface of the earth. Compass 48 allows for compensating routines to evaluate data that may be retrieved from ranging sensors 36 that may not be optimally positioned. For example, if station 24 is canted at an angle relative to stations 20 and 22, the information received from RFID tags 18 may lead to a different sequencing than anticipated if station 24 were oriented in a different direction. The compensation of the directional orientation of stations 20, 22 and 24 are thus accounted for and compensated by the method of the present invention.

A clock 50 timestamps the readings received by sensor systems 34 for the evaluation of the data by either the master sensor system or by a remote computer, not shown. In order to give a good indication as to whether sensor systems 34 are receiving information from RFID tags 18 an audio and/or visual indicator 52 is placed on a portion of sensor system 34 to allow a person positioning stations 20, 22 and 24 to quickly evaluate as to whether sensor systems 34 are detecting RFID tags 18. A power system 54 provides electrical energy to each sensor system 34 and may be a fuel cell, a generator system, or a solar power system connected to batteries, which provide electrical energy to sensor systems 34.

Figure 4:
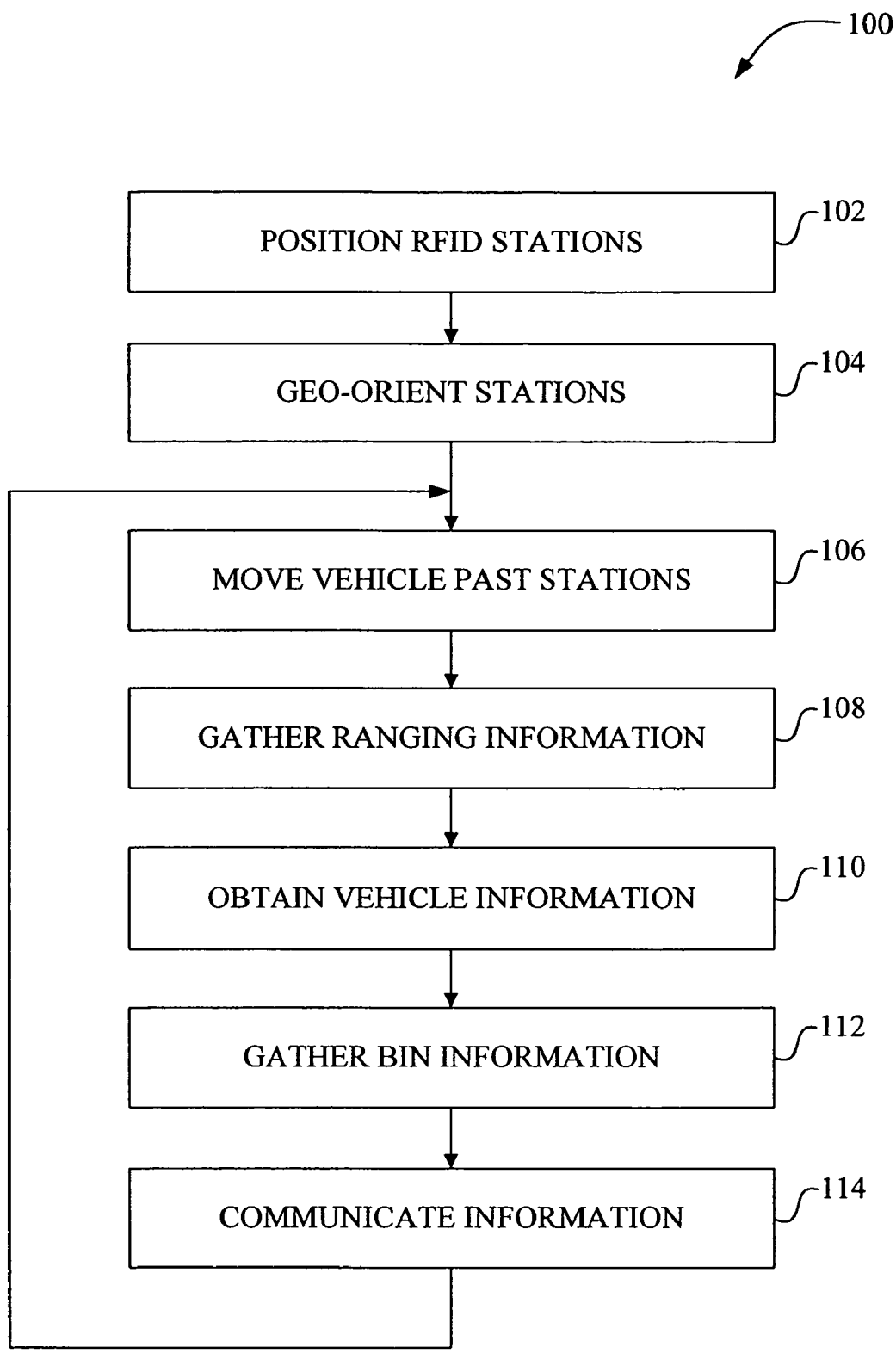
FIG. 4 is a depiction of an embodiment of a method of the present invention.

Now, additionally referring to FIG. 4, there is shown a method 100, which represents one embodiment of a method to operate RFID portal system 10. A field location is identified and stations 20, 22 and 24 are transported to a roadway through which vehicles 12 will pass as they enter and exit a field. At step 102 RFID stations 20, 22 and 24 are positioned along a roadway. Although three stations are shown, more or less may be utilized in accordance with the present invention. Further, although FIG. 1 shows a single lane with room for only one vehicle 12 to pass between stations 20, 22 and 24, is it to be understood that the roadway may be wider and may in fact allow traffic in two directions simultaneously.

Once RFID stations 20, 22 and 24 are positioned, at step 102, stations 20, 22 and 24 go through a geo orientating process, at step 104, in which the position of stations 20, 22 and 24 is determined relative to each other and their position on the surface of the earth. Compass 48 provides information relative to the general direction in which each station is oriented. As vehicle 12 moves toward and past stations 20, 22 and 24, at step 106, certain information is gathered as vehicle 12 moves. Initially ranging sensors 36 detect movement of vehicle 12, at step 108. Ranging information indicates the direction from which vehicle 12 is approaching and its velocity. This information is potentially useful relative to how the operator is driving vehicle 12, such as the care the operator exhibits in the operation of vehicle 12. As mentioned previously, ranging sensor 36 may also send a wakeup signal to processor 42 causing appropriate elements of sensor system 34 to become active.

Vehicle information is gathered at step 110, in which RFID tag 18 located on a surface of truck 12 is read by at least one of stations 20, 22 or 24. This identification information then allows a connection to be established between containers 14 and 16 relative to vehicle 12 and the identification information thereof. As vehicle 12 passes by and between stations 20, 22 and 24, RFID readers 38 send out signals by way of directional antennas 40 and RFID tags 18 on containers 14 and 16 respond providing information to sensor systems 34. Sensor systems 34 communicate with each other in order to allow individual systems 34 to perform either in concert with each other during the same time intervals, or at different time intervals, to cause RFID tags 18 to respond to the different signals from various sensor systems 34. As containers 14 and 16 may be oriented differently upon vehicle 12 and located vertically at different positions the multiple readings from sensors 34 are compared to provide positioning information of containers 14 and 16. Once the information of steps 108, 110 and 112 are gathered, the information can be combined and processed or transmitted without further processing. At step 114, the information that has been gathered is communicated to another computer system, not shown. Communication step 114 may be executed after some prompt such as after a certain number of vehicles 12 pass by portal system 10, or the communication of information may be by way of a memory transfer affected by an operator that is on site.

The present invention provides in field data collection that can be utilized to evaluate product delivery and control inventory en route. RFID portal system 10 allows for remote operation without an investment requirement for a permanent station. System 10 allows for the capture of critical supply chain data as harvested material moves from the field to the processing facility or warehouse.

The foregoing has described the use of multiple RFID readers 38 with each reader 38 covering an expected vertical position of RFID tags 18. This allows stacking order to be determined as vehicle 12 passes between stations 20, 22 and 24 and may be utilized by later controlling the routing of the container and its contents once it reaches a storage or processing facility. It is also contemplated that a single RFID reader using a variable direction antenna or multiple antennas may be used to carry out the method of the present invention.

Communications module 44 is used to convey data and information collected by portal system 10 to a back office inventory/supply chain management system. The communication process can be wireless, such as Wi-Fi, Wi-Max, or cellular telephone connections. Communications 44 may also be a communication of data to a data or storage device, such as a compact flash card and the compact flash card can be physically taken from the location for downloading at a different computing station.

Ranging sensors 36 that detect the direction of travel and velocity of vehicle 12 can be implemented using ultrasonics, laser ranging or other systems known in the art.

While a single RFID station 20, 22 or 24 may be utilized to read RFID tags 18 on containers 14 and 16 as vehicles 12 go by, the radio frequencies used by RFID readers 28 can have a high signal attenuation through water or liquid containing items such as fruits and vegetables. For that reason it is likely that more than one RFID station would be utilized to gather the data. As previously mentioned, one sensor system 34 may serve as a master with several slave sensor systems 34. Slave sensor systems may not include all of the features of the master. For example, master sensor system may have a long range communications capability which the slave systems would not. Sensor systems 34 would communicate with each other using a short range wireless method, such as Bluetooth or 802.11 and the communication method may use compressing algorithms to reduce the amount of power necessary to transfer data.

The information generated by the interaction of master and slave RFID readers may be combined and may include any or all of the following:
- Date
- Time
- Master Portal Location
- Vehicle ID and/or Type
- Operator Identification
- Vehicle/Load Direction of Travel
- Vehicle/Load Speed of Travel
- Load Identification of Each Container and Position Thereof
- Load Attributes Such As Container Empty or Full, Temperature From An Active RFID Tag Having A Temperature Sensor Therein Or Other Data The data gathered by portal system 10 becomes part of the supply chain record and can be transmitted from the deployed orchard or field setting as controlled by processor 42.

Additional information that may be utilized by portal system 10 may be to alert individuals of vehicles that are not authorized to enter the work area and to measure profiles of vehicles in order to determine whether a profile of the vehicle is appropriate for the RFID tag 18 associated with a particular vehicle 12. For example the profiles received by ranging sensor 36 of a vehicle allow for a determination of relative mass densities as the vehicle goes by. For example, a semi-tractor trailer rig may be detected as a short mass representative of the tractor then perhaps a space between the tractor and the trailer followed by a relatively long trailer. In contrast, a tractor having a single container on a set of forks, passing through would have a different distinct profile as detected by ranging sensors 36. These profiles can be compared to the RFID tag 18 associated with each vehicle in order to determine if spoofing of a RFID tag 18 has been attempted.

Having described the preferred embodiment, it will become apparent that various modifications can be made without departing from the scope of the invention as defined in the accompanying claims.

The invention claimed is:

1. An agricultural portal system for use along a transportation route, comprising:
   a plurality of agricultural containers, a responding device connected to one or more of the agricultural containers, said agricultural containers being transported on the transportation route proximate to the agricultural portal system;
   at least one movable support positioned along a transportation route and spatially separated from the agricultural containers;
   at least one identification system connected to said movable support, said at least one identification system directed toward the transportation route, said at least one identification system receiving a signal from the responding device thereby obtaining information about said agricultural containers when a container with the responding device approaches toward or passes by the identification system on the transportation route, the information comprising load identification of each of the agricultural containers and load attributes indicative of the agricultural containers being empty or full; and
   a communications system to communicate said information.

2. The agricultural portal system of claim 1, wherein said at least one movable support includes a first movable support and a second movable support, said at least one identification system including a first identification system and a second identification system, said first identification system being associated with said first movable support and said second identification system being associated with said second movable support.

3. The agricultural portal system of claim 2, wherein said at least one identification system includes a global positioning system to provide location information to be transmitted by said communications system.

4. The agricultural portal system of claim 2, wherein said first identification system is a master system and said second identification system is a slave system, said slave system being in communication with said master system.

5. An agricultural portal system for use along a transportation route upon which agricultural containers are transported, the agricultural portal system, comprising:
   a responding device on one or more agricultural containers;
   at least one movable support positioned along a transportation route and spatially separated from the agricultural containers;
   at least one identification system connected to said movable support, said at least one identification system directed toward the transportation route, said at least one identification system receiving a signal from the responding device thereby obtaining information about the agricultural containers when a container with the responding device approaches toward or passes by the identification system on the transportation route, the information comprising load identification of each of the agricultural containers and load attributes indicative of the agricultural containers being empty or full; and
   a communications system to communicate said information.

6. The agricultural portal system of claim 5, wherein said at least one movable support includes a first movable support and a second movable support, said at least one identification system including a first identification system and a second identification system, said first identification system being associated with said first movable support and said second identification system being associated with said second movable support.

7. The agricultural portal system of claim 6, wherein said at least one identification system includes a ranging sensor to gather distance and speed information of an approaching vehicle.

8. The agricultural portal system of claim 6, wherein said at least one identification system includes a Radio Frequency Identification (RFID) reader.

9. The agricultural portal system of claim 6, wherein said at least one identification system includes at least one of an audio indicator and a visual indicator that said identification system has received information from at least one of the responding devices.

10. The agricultural portal system of claim 6, wherein said at least one identification system includes a global positioning system to provide location information to be transmitted by said communications system.

11. The agricultural portal system of claim 6, wherein said first identification system is a master system and said second identification system is a slave system, said slave system being in communication with said master system.

12. The agricultural portal system of claim 6, wherein said first movable support is positioned along a side of the transportation route, said second movable support being positioned along an opposite side of the transportation route.

13. The agricultural portal system of claim 6, wherein said first movable support is positioned along a side of the transportation route, said second movable support being positioned along said side of the transportation route a distance from said first movable support.

14. A method of obtaining information about agricultural shipping containers, comprising the steps of:

temporarily positioning at least one information gathering sensor along a transportation route of a vehicle and spatially separated from the agricultural shipping containers;

transporting a plurality of agricultural shipping containers past said at least one sensor; and querying a responding device on each of said plurality of containers by way of said at least one sensor to provide container information when at least one of said containers with the responding device approaches toward or passes by the information gathering sensor on the transportation route, the container information comprising load identification of each of the agricultural shipping containers and load attributes indicative of the agricultural shipping containers being empty or full.

15. The method of claim 14, further comprising the step of obtaining vehicle identification information of a vehicle transporting said containers.

16. The method of claim 14, wherein said container information for each of said containers includes a temperature.

17. The method of claim 15, further comprising the steps of:

associating said container information regarding said containers on said vehicle with said vehicle identification information; and communicating said container information and said vehicle identification information.

18. The method of claim 17, further comprising the step of determining positions of the containers on said vehicle and communicating determined position information of the containers in said communicating step.

19. The method of claim 17, further comprising the step of determining a speed of said vehicle and communicating said speed in said communicating step.

\* \* \* \* \*